Patented Feb. 7, 1933

1,896,876

UNITED STATES PATENT OFFICE

HARRY G. WILDMAN, OF WESTMOUNT, QUEBEC, CANADA, ASSIGNOR OF ONE-HALF TO CARL H. FOWLER, OF NEW YORK, N. Y.

PROCESS OF RECOVERING MERCURY

No Drawing.   Application filed November 21, 1931. Serial No. 576,614.

My invention relates to a method of recovering mercury from ores.

The commercial supply of mercury is obtained from cinnabar, and usually by comparatively expensive methods of distillation. In the usual commercial works a vast amount of equipment is required.

My invention relates to what may be termed a "wet" method, and the principal object of the invention is to provide a relatively simple, inexpensive method of recovering mercury.

In accordance with my invention the rock containing cinnabar is preferably first crushed and then is treated with an alkaline sulphide, preferably a solution of sodium sulphide, which dissolves out the cinnabar, forming a soluble double salt $HgS\cdot Na_2S$. The solution containing the double salt is separated from undissolved rock by filtration or decantation, and the HgS precipitated from the solution by adding an acid. I prefer to acidulate the solution by passing sulphur dioxid therethrough, the reaction being as follows:

(1) $HgS\cdot Na_2S + H_2O + SO_2 = HgS + Na_2SO_3 + H_2S.$

The HgS is thus precipitated as a black powder which may be separated from the solution by filtration or decantation, which precipitate is preferably washed. The metallic mercury may be recovered directly from this precipitate by any of the well known means, but I prefer to employ the usual method of roasting in the presence of air at suitable temperature, so as to oxidize the sulphur and vaporize the mercury, which may then be condensed as metallic mercury. The reaction is—

(2) $HgS + O_2 = Hg + SO_2.$

The $SO_2$ gas driven off may be used over again to precipitate HgS from a succeeding batch in accordance with the previous reaction.

It will be seen that the method herein disclosed is a relatively cheap one. Instead of employing the vast amount of heat required to treat rather lean ores for the distillation of mercury therefrom, my method requires only a small amount of heat for treatment of relatively pure HgS.

The sodium sulphide used as a solvent in the first step of the process is quite cheap and may also be used over and over again. For example, the filtrate containing $Na_2SO_3$ from reaction No. 1 may be evaporated and reduced, as by burning with coal, in accordance with the following reaction:

(3) $2Na_2SO_3 + 3C = 2Na_2S + 3CO_2.$

While I am aware that one other so called wet method of recovering mercury has been suggested, I understand that it does not work out satisfactorily from a commercial point of view, probably due to the high cost and rather intricate methods employed. My method employs relatively cheap reagents, which may be recovered for continuous use and with the expenditure of but little heat.

While a preferred form of the invention has been described in some detail, I wish it understood that variations may be made within the scope of the invention as defined in the appended claims.

I claim:

1. The method of recovering mercury from cinnabar ores, which comprises dissolving the cinnabar from the ore with sodium sulfide to form a soluble double salt of mercuric sulfide and sodium sulfide, acidulating the solution with sulfur dioxide to precipitate mercuric sulfide, treating the precipitated mercuric sulfide with oxygen to produce metallic mercury with the evolution of sulfur dioxide, and using such sulfur dioxide for precipitating more mercuric sulfid from a subsequent batch.

2. The method of recovering mercury from cinnabar ores, which comprises dissolving the cinnabar from the ore with sodium sulfide, acidulating the solution with sulfur dioxide to precipitate mercuric sulfide and leave the sodium sulfite in solution, treating the mercuric sulfide with oxygen to form sulfur dioxide for use in precipitating more mercuric sulfide and metallic mercury, and reducing the sodium sulfite to form sodium sulfide for dissolving more cinnabar.

3. The method of recovering mercury from cinnabar ores, which comprises dissolving the cinnabar from the ores with an alkali sulfide to form a double salt of mercuric sulfide and alkali sulfide, acidulating the solution with sulfur dioxide to precipitate mercuric sulfide, and then oxidizing the mercuric sulfide to produce metallic mercury with revolution of sulfur dioxide for precipitating more mercuric sulfide from a subsequent batch.

4. The method of recovering mercury from cinnabar ores, which comprises dissolving the cinnabar from the ores with an alkali sulfide, acidulating the solution with sulfur dioxide to precipitate mercuric sulfide and leave the alkali sulphite in solution, treating the mercuric sulfide to produce mercury, and reducing the alkali sulfite to form alkali sulfide for dissolving more cinnabar.

HARRY G. WILDMAN.